Dec. 26, 1967 YUKIO SAITO ETAL 3,360,719

POLAROGRAPHIC APPARATUS

Filed April 28, 1967 7 Sheets-Sheet 2

Dec. 26, 1967 YUKIO SAITO ETAL 3,360,719

POLAROGRAPHIC APPARATUS

Filed April 28, 1967 7 Sheets-Sheet 4

United States Patent Office 3,360,719
Patented Dec. 26, 1967

3,360,719
POLAROGRAPHIC APPARATUS

Yukio Saito, Warabi-shi, and Koichi Okamoto, Kawasaki-shi, Japan, assignors to Sankyo Company, Limited, Tokyo, Japan Filed Apr. 28, 1967, Ser. No. 634,650
Claims priority, application Japan, Jan. 30, 1962, 37/2,600, 37/2,601
6 Claims. (Cl. 324—31)

ABSTRACT OF THE DISCLOSURE

An oscillopolarograph having a linearly varying voltage superposed with a square wave voltage applied to its cell through an amplifier for at least the square wave voltage, is provided with positive feedback of a portion of the cell current to such amplifier to allow sampling of the net cell diffusion current in each half cycle of the square wave, and the influence of a high rate of change of the linear sweep voltage on the charging current is avoided by providing a filter or frequency selective amplifier in the faradaic current detector circuit to pass only that component of the cell current which has the frequency of the square wave.

*Specification*

Figures 1, 2, 5:
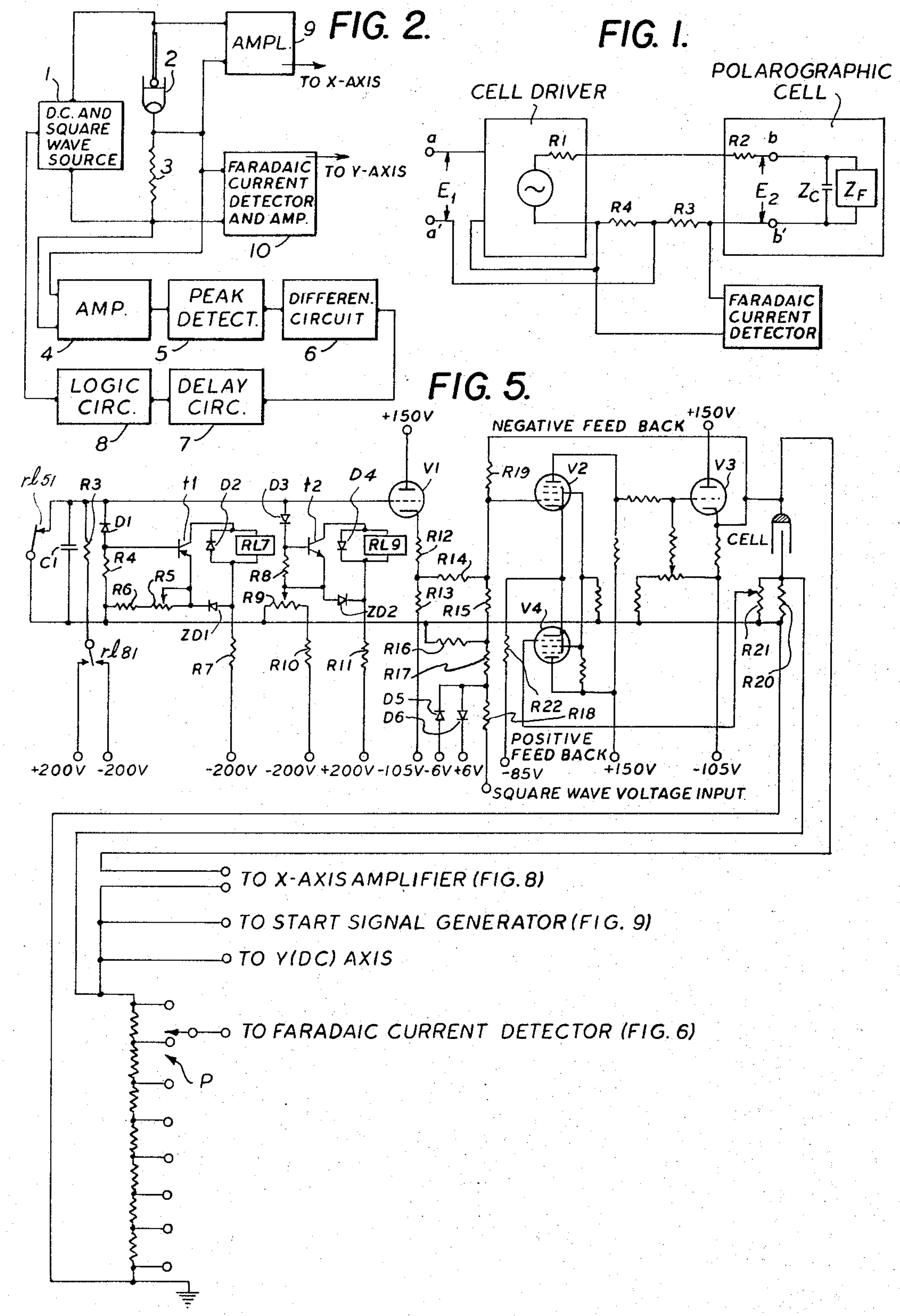

This application is a continuation-in-part of our copending application Ser. No. 252,870, filed Jan. 21, 1963, and now abandoned.

This invention relates to polarographic apparatus, and more particularly is directed to improvements in square wave oscillopolarographs.

In the specification and claims hereof, the term "oscillopolarograph" is intended to include all types of oscillographic and oscilloscopic polarographs, that is, without limitation as to the device by which the results are recorded or indicated, which device may be, for example, a pen-recorder, an electromagnetic recorder, a cathode ray tube, or the like.

Alternating current type polarographs are known to suffer from the influence on the polarogram of the charging current for the capacity of the electric double layer formed on a dropping mercury electrode. The charging current varies with the growth of the mercury drop and is also significantly influenced by the rate of change of the voltage applied to the polarographic cell as well as by the magnitude of the voltage itself. Thus, in order to minimize the influence of the charging current, a small rate of change of the voltage applied to the cell has been employed. However, this results in a long time period being required for the voltage sweep of the cell and hence a multiplicity of mercury drops are required to complete the sweep. The resulting current-voltage curve involves oscillations arising from the growth and the fall of the mercury drops, and such oscillations obscure the polarogram. Further, it has been proposed to complete the voltage sweep during the life of a single mercury drop, which is of the order of several seconds, but the technique used to compensate for the influence of the charging current is complex, and moreover is unsatisfactory in that the compensation is only partially or approximately achieved.

It is also known to provide an alternating current type polarograph in which a linearly varying or ramp voltage is superposed with a series of square wave voltages of small amplitude before being applied to a polarographic cell, for example, as disclosed in U.S. Patent No. 2,766,423, issued to G. C. Barker on Oct. 9, 1956. In such an alternating current type device, hereinafter referred to as the "Barker" device, the cell current sharply increases at the rising end of the square wave voltage and exponentially decays to a value dependent on the faradaic or diffusion current corresponding to a cell voltage which is represented by the sum of half the amplitude, peak to peak, of the square wave and the magnitude of the linear voltage at the moment of the rising of the square wave. A similar increase in the cell current occurs at the falling end of the square wave in the opposite direction, whereafter the cell current decays to a value dependent on the diffusion current corresponding to the voltage across the cell which is the magnitude of the ramp voltage at that time minus half the amplitude of the square wave. These values, to which the cell current decays in the positive or negative half period of the square wave, are not the same and the difference between them is explained to be a measure of the change in the diffusion current caused by the application of the square wave voltage. Thus, the Barker device functions to provide a polarogram which is much like that of a derivative polarograph with the above difference in decay values being plotted over successive cycles of the square wave during the sweep of the cell voltage. Though the Barker device provides an improved sensitivity, as compared with that of the direct current method, it requires a long time, for example, more than several minutes, to complete the sweep so that a rapid reaction cannot be followed with such device.

Accordingly, it is an object of the invention to eliminate the influence of the charging current on the accuracy of the measurements by a polarographic device, and to make possible the tracing of rapidly changing reactions.

Another object is to provide an oscillopolarograph in which a linearly varying voltage superposed with a series of square wave voltages is applied to the cell and sampling is effected in successive half-periods of the square wave and the total sweep time is very short, for example, of the order of one-half second.

A further object is to provide an oscillopolarograph of the described character in which square wave voltages of relatively high frequency can be applied to the cell to improve the resolution of the polarogram.

In accordance with an aspect of this invention an oscillopolarograph having a linearly varying voltage superposed with a series of square wave voltages applied to its polarographic cell is provided with positive feed back means which feeds back a portion of the cell current to the input of an amplifier driving the cell, and which amplifies both the linear voltage and the square wave voltage or the square wave voltage alone. The positive feed back serves to substantially reduce the series resistance in the charging circuit of the equivalent capacity of the electric double layer formed on the mercury drop, so that, in effect, the charging current terminates within a sufficiently short period after the rising or falling end of the square wave, thereby allowing the net cell diffusion current to be sampled through a gate circuit in each half cycle of the square wave. Because the time constant for charging the electric double layer capacity can be thus greatly reduced, a square wave voltage of a much higher frequency than heretofore employed can be used to improve the resolution of the half wave potential. In addition, the polarogram is obtained within a short period which is well within the life of a single mercury drop.

When the sweep is compeleted in a short period, such as one-half second, the rate of change of the linear sweep voltage becomes high, so that the influence of the linear voltage on the charging current must also be avoided.

In accordance with another aspect of this invention such influence of the linear voltage having a high rate of change is avoided by providing a frequency selective amplifier or filtering means in the faradaic current detector circuit of the polarographic apparatus so as to pass only that component of the cell current which has the frequency of the square wave.

Further, when the voltage sweep of the cell is completed within the life of a single mercury drop, it is essential for the reproducibility of the polarogram that the sweep of the cell voltage, that is, the measurement takes place in a constant range of dimension of the mercury drop. It is still another feature of the invention to provide an advantageous arrangement for producing a synchronizing pulse when the mercury drop falls, which pulse actuates the sweeping circuit for the cell after being delayed a predetermined period, so as to ensure that measurement takes place in a constant range of dimension of the drop.

Figure 3:
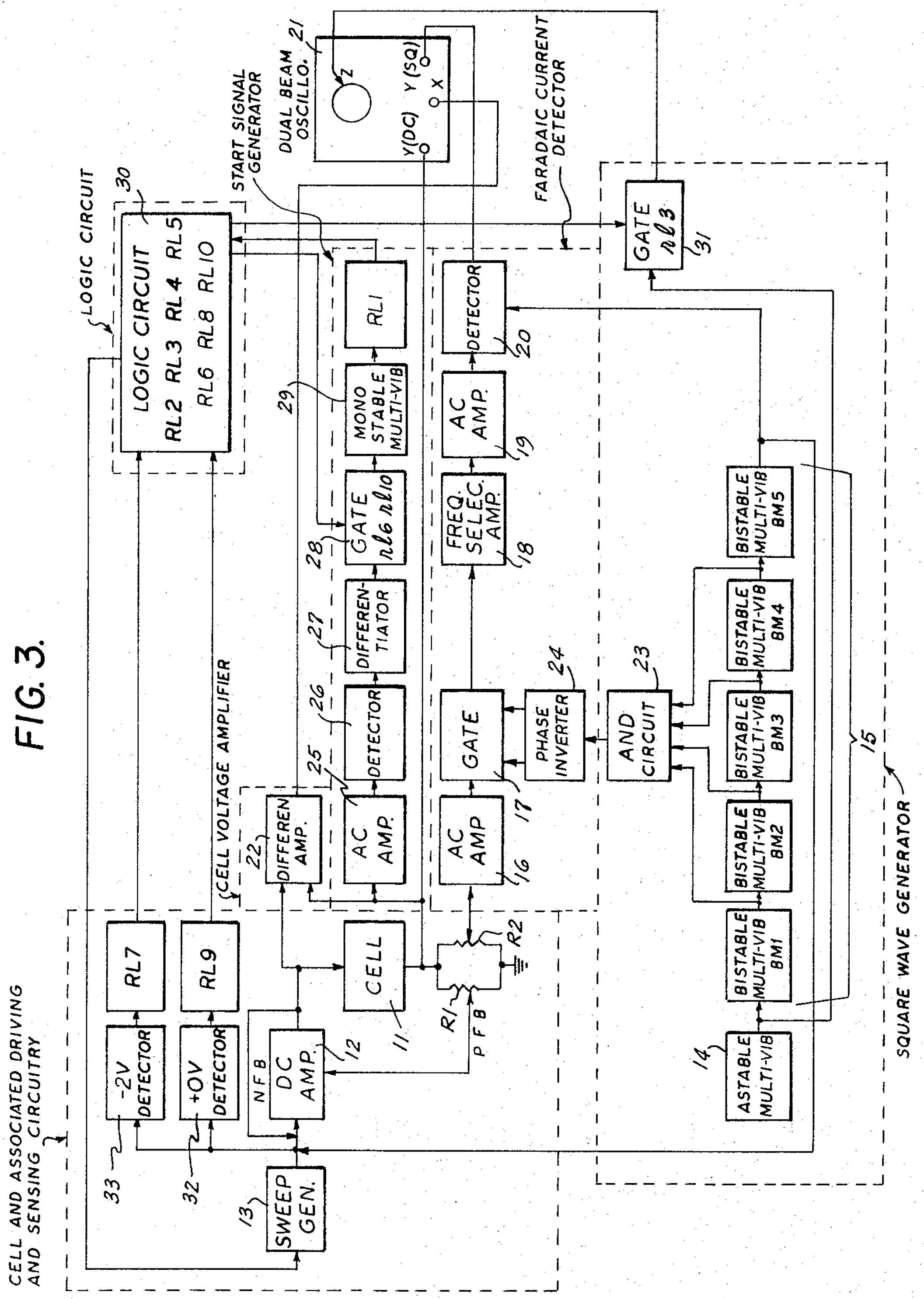
Figure 4:
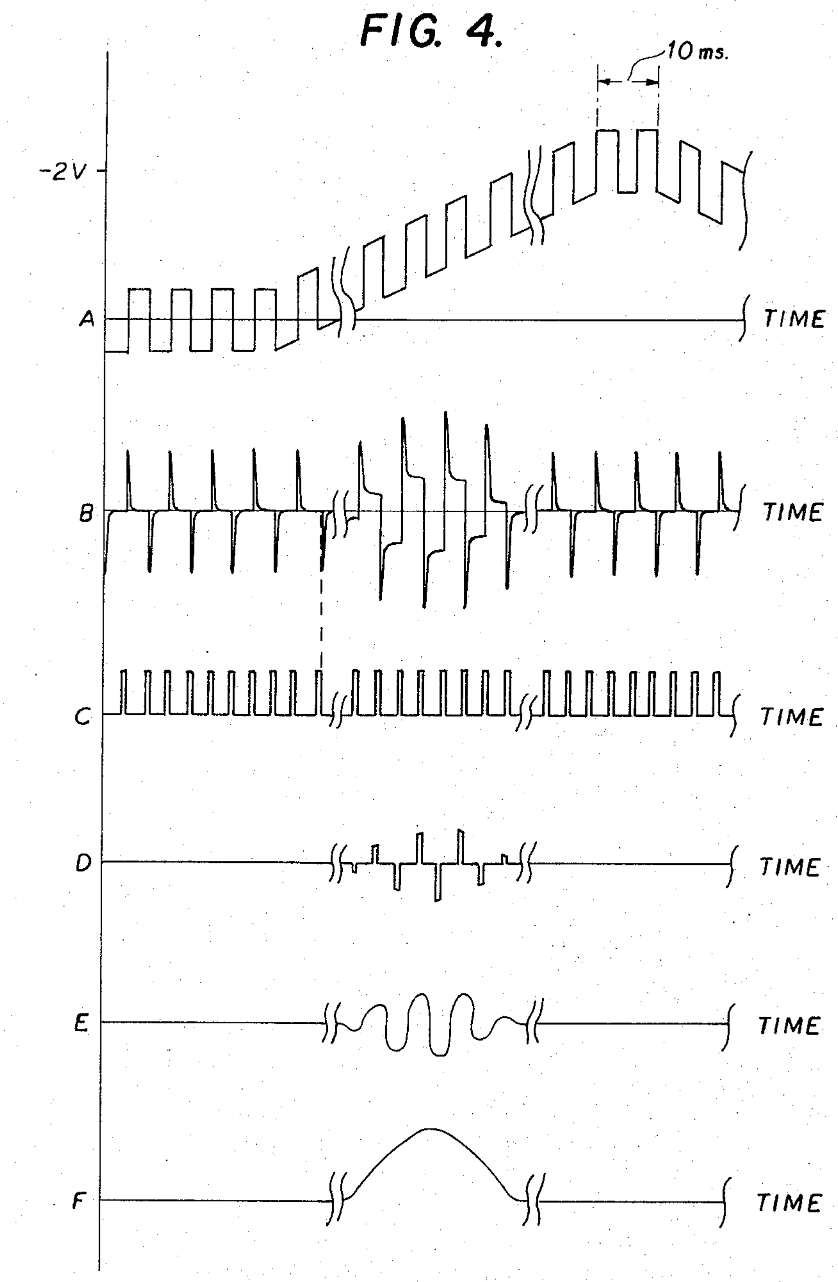
Figure 6:
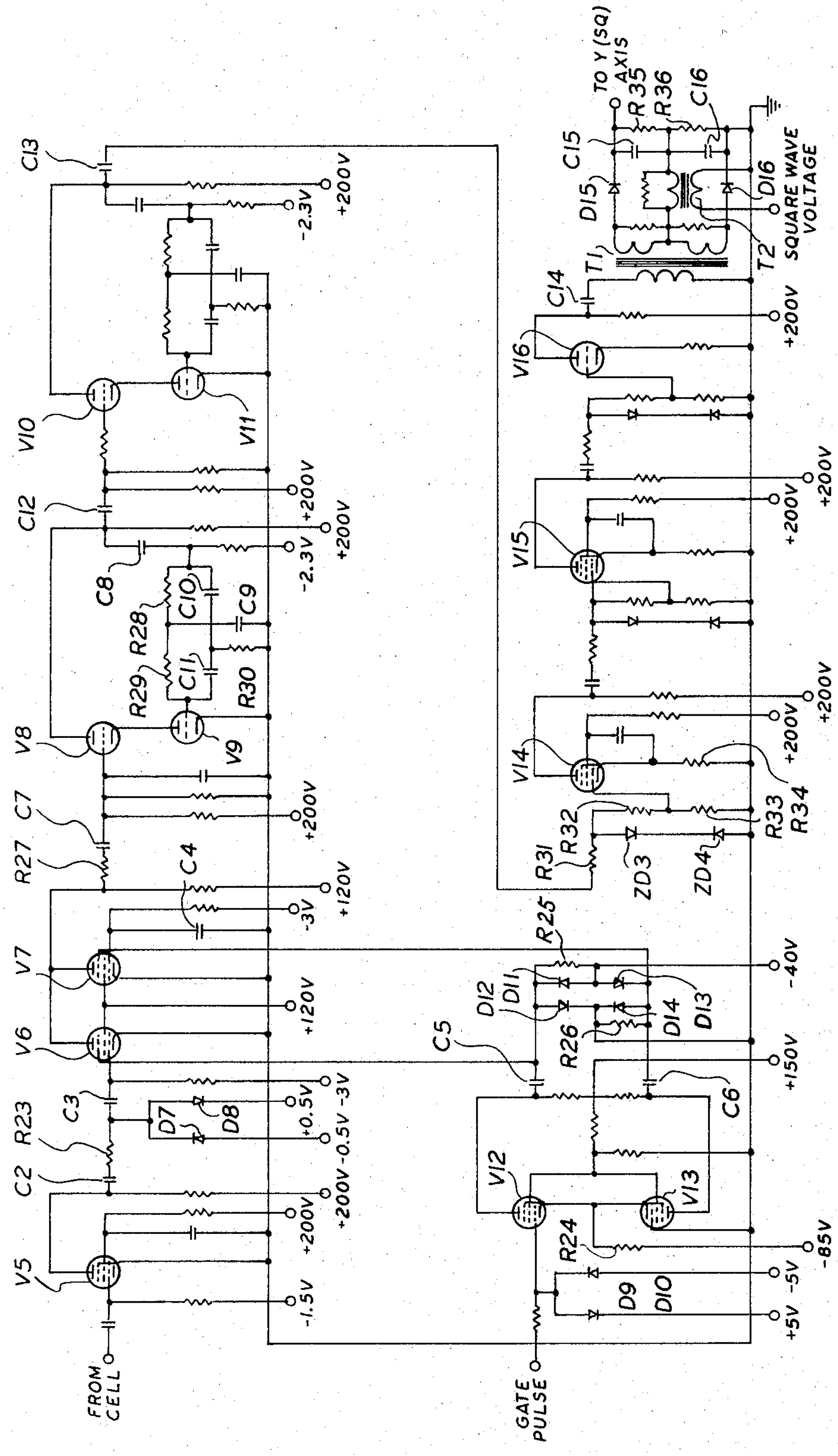
Figure 7:
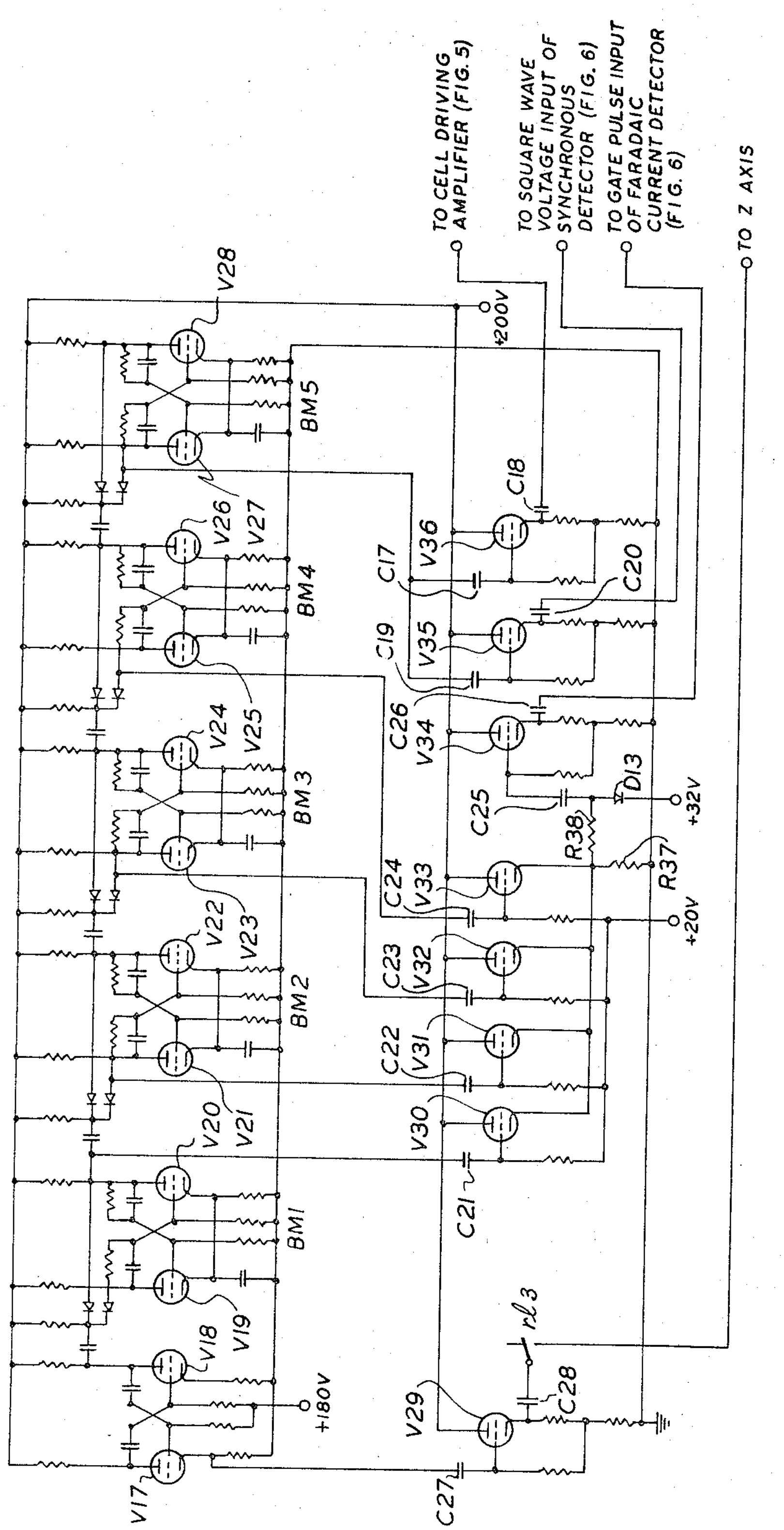
Figure 10:
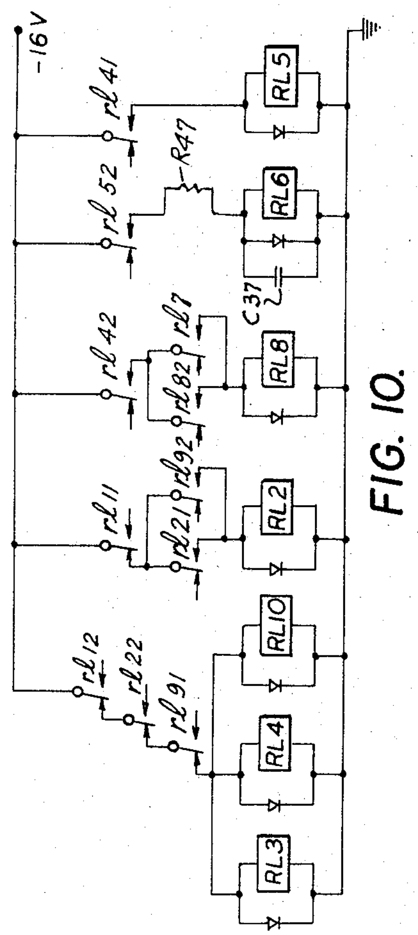
Figure 8:
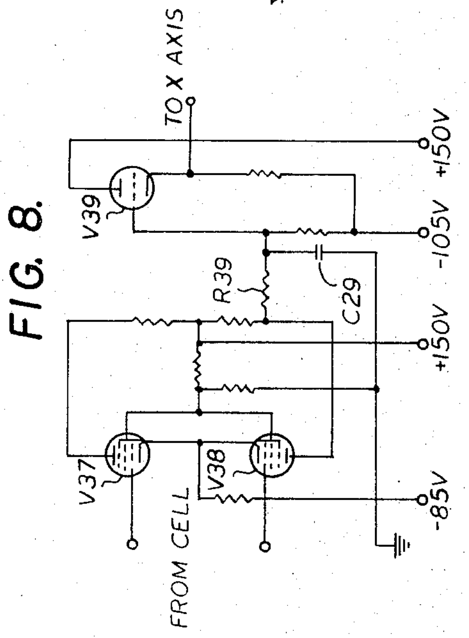
Figure 9:
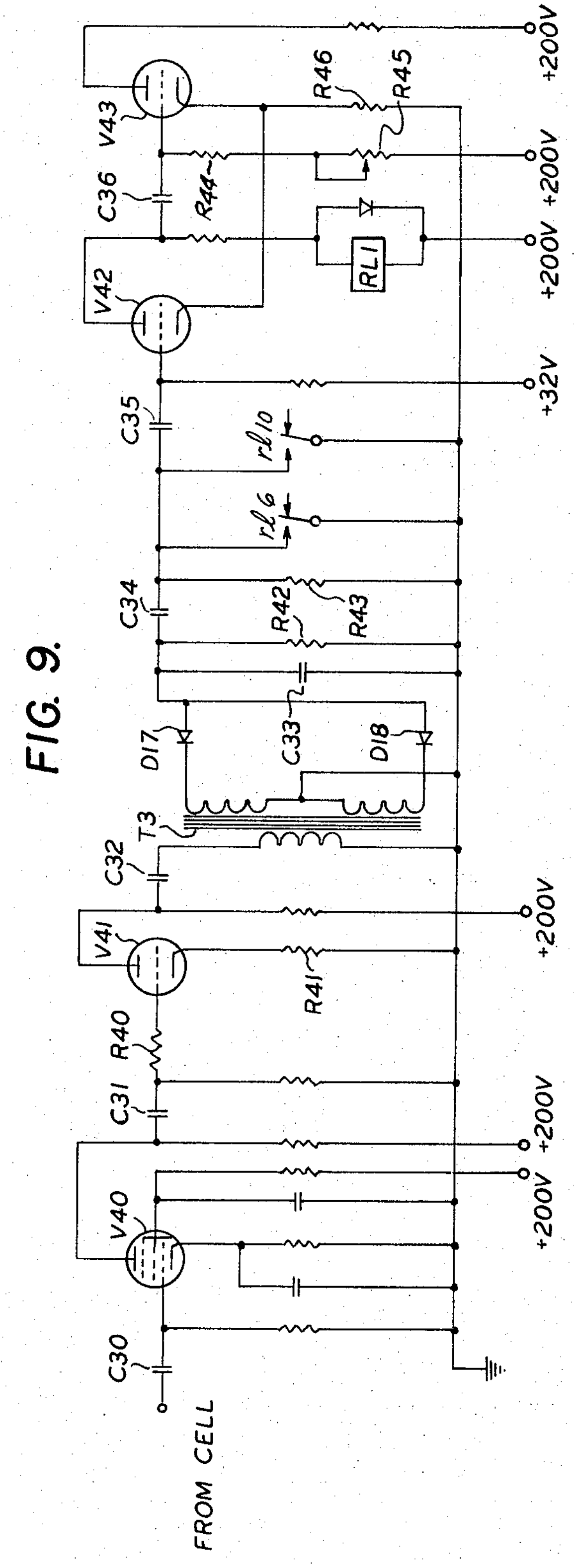
Figure 11:
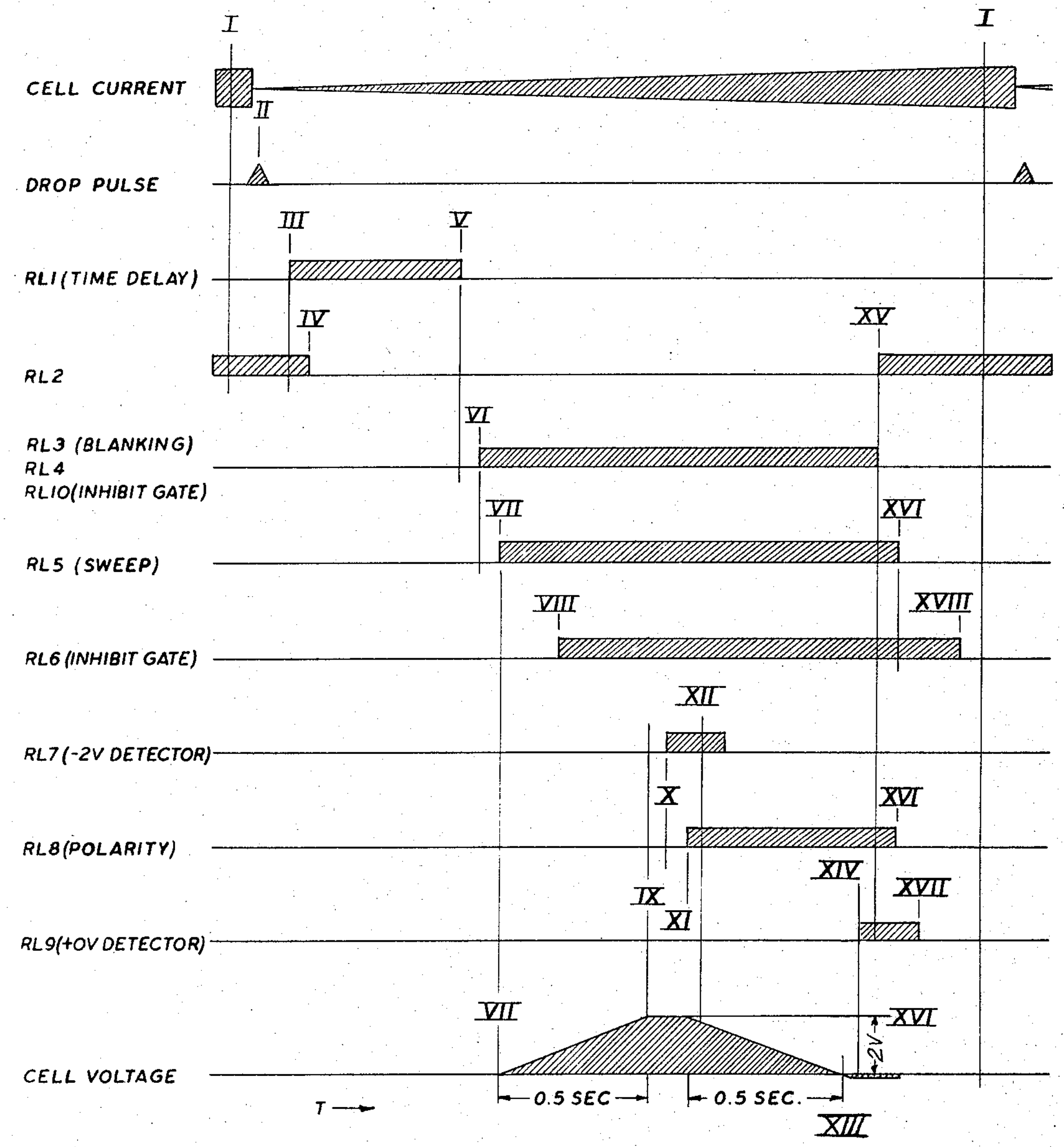

These, and other objects, features and advantages of the invention, will be apparent from the following detailed description of an illustrative embodiment thereof which is to be read with reference to the accompanying drawings, wherein:

FIG. 1 is a schematic view illustrating the positive feedback of the cell current according to the invention, FIG. 2 is a black diagram of a start signal generator according to the invention, FIG. 3 is a block diagram of an oscillopolarograph according to one embodiment of the invention, FIG. 4 shows various wave forms for illustrating the operation of the oscillopolarograph shown in FIG. 3, FIG. 5 is a circuit diagram of a cell driver and associated circuitry included in the oscillopolarograph of FIG. 3, FIG. 6 is a circuit diagram of a faradaic current detector including a gate circuit forming a part of the oscillopolarograph of FIG. 3, FIG. 7 is a circuit diagram of a square wave generator which forms part of the oscillopolarograph of FIG. 3, FIG. 8 is a circuit diagram of a cell voltage amplifier for providing an X-axis input to the oscilloscope shown in FIG. 3, FIG. 9 is a circuit diagram of a start signal generator included in FIG. 3, FIG. 10 is a circuit diagram of a logic circuit incorporating relays and forming a component of the oscillopolarograph of FIG. 3, and FIG. 11 is a timing chart illustrating the sequence of operation of the apparatus shown in FIG. 3.

Referring to FIG. 1, there is shown, in a simplified schematic form, an equivalent circuit of a polarograph. Across the terminals $a$, $a'$ is applied a linear sweep voltage in combination with a train or series of square wave voltages of small amplitude, which input is amplified in the cell driver. The output of the cell driver is represented as an alternating current source by usual symbol and the internal resistance of the cell driving amplifier is denoted by $R_1$. As is known, a polarographic cell containing a dilute solution may be considered electrically equivalent to a resistor $R_2$ in series with a parallel connection of the impedance of the electric double layer capacity $Z_c$ and the faradaic impedance $Z_F$. A faradaic current detector is coupled across resistors $R_3$ and $R_4$ connected in series with the cell. In accordance with the invention the voltage drop across the resistor $R_4$ is positively fed back to the input of the cell driving amplifier. The ratio of the voltage $E_2$ across the terminals $b$, $b'$ to the voltage across the terminals $a$, $a'$ then is represented by the following equation:

$$\frac{E_2}{E_1}=\mu\frac{Z_c\cdot Z_F/(Z_c+Z_F)}{R_1+R_2+R_3(1-\mu)R_4+Z_c\cdot Z_F/(Z_c+Z_F)}$$

where $\mu$ denotes the degree of amplification of the cell driving amplifier. The term $R_1+R_2+R_3+(1-\mu)R_4$ in the denominator represents the resistance across the terminals $b$, $b'$ to the left thereof as viewed in FIG. 1. Therefore, when this sum is made as small as possible, within the limit that it does not become negative, the time constant for charging the electric double layer capacity is minimized, and theoretically can be reduced to zero. Practically, however, a lower limit of definite value exists for the time constant dependent upon the design of the cell driving amplifier and the polarographic cell. To give an example, it has been found that, with the polarograph according to the invention, the charging current terminates within several microseconds. Preferably, the cell driver is also provided with a negative feedback to improve its linearity and stability. In FIG. 1, the voltage for the positive feedback is taken from across the resistor $R_4$ which forms a part of the composite cell-current sensing resistor $R_3$, $R_4$. However, it will be apparent that these functions may be performed by independent elements.

Referring to FIG. 2, there is schematically shown a start signal generator in accordance with this invention which produces a signal to start the sweep of the cell voltage at a predetermined time after the mercury drop has fallen. During the sweep, a source 1 superimposes on a polarographic cell 2 a sweep voltage linearly varying between 0 and −2 v. and a square wave voltage of small amplitude, for example, 5 to 50 mv., so that the voltage applied to the cell has a wave form as shown at A on FIG. 4. A resistor 3 is connected in series with the cell 2 and the voltage drop caused by the cell current across resistor 3 is applied to an AC amplifier 4. For the sake of clarity in describing the start signal generator, the cell driving amplifier and the arrangement of the positive feedback described in connection with FIG. 1 are not shown in FIG. 2, but it should be understood that similar provision is made through another resistor (not shown) in series or in parallel with the resistor 3. In one embodiment of the invention, square wave voltage is continuously applied to the cell during the operation of the polarographic apparatus and the resulting cell current is illustrated at the left-most part of wave form B on FIG. 4. As shown, the cell current at this time, that is, before the start of the sweep, is the charging current for the electric double layer, since no electrode reaction takes place. The charging current sharply increases at the rising end of the square wave and rapidly decays to substantially zero. During the subsequent half period of the square wave, a similar flow of the charging current occurs in the opposite direction. The sweep, or application of the linearly varying voltage to the cell is initiated when a mercury drop has reached a predetermined dimension, which will occur nearly five seconds after the fall of the preceding mercury drop when the drop has a life of seven seconds. When the sweep voltage approaches or exceeds the half-wave potential of reducible ions present in the cell, the cell current does not decay to zero in each half-period of the square wave, but has a definite value which progressively varies and becomes maximum near the half-wave potential, the above mentioned value of cell current being indicative of a cell diffusion current or faradaic current. It is to be noted that the showing at B on FIG. 4 is only exemplary of a cell current which occurs in the oscillopolarograph according to the invention and is not intended to exactly illustrate an actual flow of the cell current. Thus, in practice, the frequency of the square wave will be much higher than shown and the maximum on the envelope will have a greater amplitude. Moreover, as the linear voltage approaches the end of the sweep, for example, −2 v., the envelope of the cell current would exhibit another maximum caused by hydrogen ions usually present in the cell and by supporting electrolyte. Upon arrival of the linear voltage at −2 v., the direction of the sweep is reversed as indicated in wave form A on FIG. 4, where it will be noted that such reverse sweep begins after a pause of about 10 milliseconds. This delay is caused by the use of relays in the logic circuit controlling the sweep and can be substantially eliminated if these relays are replaced by electronic components such as transistors. During the reverse sweep, an oxidation wave will be obtained which is similar to the reduction wave shown at F on FIG. 4.

It will be seen from FIG. 11 that the cell current increases with the growth of the mercury drop. As mentioned above, the square wave voltage is continuously applied to the cell during the operation of the polarograph so that when the linear sweep voltage is not applied to the cell, the cell current comprises the charging current. When the mercury drop falls, the charging current abruptly terminates so that a positively-defined pulse will be obtained in synchronism with the fall of the mercury drop. Moreover, in accordance with the invention, as generally described with reference to FIG. 1, the square wave voltage is amplified in the cell driving amplifier before being applied to the cell, and the cell current is positively fed back to the input of the amplifier to thereby reduce the resistance through which the electric double layer capacity is charged. This results in a considerably greater magnitude of the peaks of the charging current than when the positive feedback is not included, so that the required amplification for producing the synchronizing pulse may be small.

Referring again to FIG. 2, it will be seen that the cell current sampled by resistor 3 and amplified by AC amplifier 4, is fed to a peak detector 5 which comprises a rectifier stage and a filter stage, and which is followed by a differentiator 6. The arrangement is such that the rectifier and filter stages of the peak detector provide an output which represents the envelope of the successive peaks of the pulse-shaped cell current. Therefore, the differentiator 6 provides a synchronizing pulse when the cell current abruptly decreases by the fall of the mercury drop. The pulse acts on a delay circuit 7 which after a predetermined period, for example, five seconds, operates a logic circuit 8 to initiate the sweep of the cell voltage again.

In FIG. 2, the voltage across the cell is applied to an amplifier 9, the output of which is coupled to the X-axis input of an oscilloscope. The amplifier 9 has a filter incorporated therein which removes the square wave component from its output so that the Z-axis of the oscilloscope is driven by the linear voltage alone. The cell current as sampled by the resistor 3 is also fed to a faradaic current detector 10 which incorporates a gate operative to pass the cell current during a portion of each half period of the square wave in which the charging current component of the cell current has decayed substantially to zero.

Referring now to FIG. 3, there is shown, in block form, one embodiment of a complete oscillopolarograph according to the invention. In such device polarographic cell 11 is fed with the output of a cell driving amplifier 12 which receives a linear sweep voltage from a sweep generator 13 and a square wave voltage from a square wave generator consisting of an astable multivibrator 14 and five bistable stages 15. These bistable stages are constituted by multivibrators $BM_1$ to $BM_5$ which each serve to provide an output of half the frequency of its input, thus acting as frequency dividers. The amplifier 12 is provided with a negative feedback circuit as indicated by a connection, designated as NFB, from the output to the input thereof, but such negative feedback is not a part of the invention nor essential thereto. A portion of the cell current flowing through a resistor $R_1$ is positively fed back (as indicated by the designation PFB) to the input side of the amplifier 12 for the purpose described above. Another resistor $R_2$ connected in parallel with the resistor $R_1$ provides a cell current input to a faradaic current detector which comprises an AC amplifier 16, a gate 17, a frequency selective amplifier 18, another AC amplifier 19 and a synchronous detector 20. The output from the latter is connected to the Y-axis of an oscilloscope 21. The X-axis of the oscilloscope is fed with the output of a differential amplifier 22 which receives two potential inputs from both electrodes of cell 11, so that its output is proportional to the voltage across the cell. As will be particularly described later with reference to FIG. 8 which shows, by way of example, a specific circuit for the differential amplifier 22, its output is free from the square wave component.

The gate 17 is opened by a gate pulse of a frequency double the frequency of the square wave voltage and of such duration that the gate 17 is allowed to be opened only during a portion of each half period of the square wave voltage. Conveniently such gate pulse is produced by an AND circuit 23 which receives four inputs from the bistable stages $BM_1$ to $BM_4$. Assuming that the astable multivibrator 14 provides a square wave having a mark to space ratio equal to unity and that the AND circuit 23 is operative to provide an output only when all of its four inputs are simultaneously mark or space signals, it will then follow from a simple analysis of waveform sequence that during each half period of the square wave voltage appearing at the output of the bistable stage $BM_5$, there is obtained at the output of the AND circuit 23 one pulse which has a width corresponding to a full period of the square wave produced by the astable multivibrator 14. The point in time at which a gate pulse is produced at the output of the AND circuit 23 can be suitably adjusted by choosing the outputs of the bistable stages $BM_1$ to $BM_4$ for said four inputs to the AND circuit. As is well known, a bistable stage has a true output and a complement output, so that either of them may be used as an input to the AND circuit depending upon the desired time of occurrence of the gate pulse. Preferably such gate pulse should be produced near, but before the end of each half period of the square wave voltage applied to cell 11 in order to obtain a cell diffusion current quite free of the charging current and to avoid the influence of the transients. A phase inverter 24 is included between AND circuit 23 and gate 17 for the purpose to be described later in connection with the specific circuit disclosed, by way of example, for the faradaic current detector (FIG. 6). The gate pulses are shown at C on FIG. 4, and the cell current which passes through the gate 17 when the latter is opened by the gate pulses is a faradaic current and has a pulse form as depicted at D on FIG. 4. As will be noted from FIG. 4, the faradaic current has a fundamental frequency which is equal to the frequency of the square wave voltage applied to the cell. The frequency selective amplifier 18 is designed so that it amplifies only the fundamental frequency component of the faradaic current and serves as an attenuator for other frequency components. Thus, variation in the cell current or the faradaic current caused by the linearly varying sweep voltage cannot appear at the output of amplifier 18. The wave form appearing at the output of frequency selective amplifier 18 is shown at E on FIG. 4. After further amplification by amplifier 19 (FIG. 3), the faradaic current is detected by the synchronous detector 20, which is arranged so that the detection be effected in timed relationship with the cycling of the square wave voltage. To this end, the synchronous detector 20 receives biasing pulses of the same frequency as that of the square wave voltage, as indicated by a connection between detector 20 and bistable stage $BM_5$.

A start signal generator is shown on FIG. 3 as comprising an AC amplifier 25, a peak detector 26, a differentiator 27, an inhibit gate 28, a monostable multivibrator 29 and a relay coil $RL_1$ which actuates its relay contacts $rl_{11}$ and $rl_{12}$ (FIG. 10) contained in a logic circuit 30. The arrangement employed in the polarograph of FIG. 3 is generally similar to that described above in connection with FIG. 2 except that the inhibit gate 28 which is constituted by relay contacts $rl_6$ and $rl_{10}$ of relays $RL_6$ and $RL_{10}$ of the logic circuit (FIG. 10), prevents the passage of noises derived from the differentiator 27 to a delay which is constituted by the monostable multivibrator 29, thereby preventing an erroneous operation of the start signal generator in response to voltage variation across the cell during the sweep. As mentioned before, the magnitude of the charging current is influenced by the magnitude of the applied voltage. In practice, relatively large variations of the charging current, or the peaks thereof, occur at the start and end of the sweep, so that the relay contact $rl_6$ and $rl_{10}$ blind the start signal generator for the period continuing from shortly before the start until after the end of the sweep.

The logic circuit 30 functions in three ways. First, it causes the sweep generator 13 to start the sweep of the linear voltage at a predetermined time after the synchronizing pulse has been obtained, thereafter to reverse the direction of the sweep towards 0 v. when the sweep voltage reaches —2 v. and to terminate the sweep at substantially 0 v. Secondly, logic circuit 30 operates the relay contacts $rl_6$ and $rl_{10}$ during the sweep. Thirdly, it controls the brightness of the spot of the oscilloscope 21 so that the spot is brightened only during the sweep. For this purpose, a gate 31 constituted by a relay contact $rl_3$ of the relay $RL_3$ of the logic circuit is interposed between the output of the astable multivibrator 14 and the brightness control Z of the oscilloscope and passes the square waves from the astable multivibrator 14 to the brightness control when relay coil $RL_3$ is energized to close the normally open relay contact $rl_3$.

The voltage levels of the cell corresponding to the start and the end of the sweep are sensed by 0 v.-detector 32 and —2 v.-detector 33. Although in FIG. 3 these level detectors are shown to sense the combination of the sweep voltage and the square wave voltage, it is desirable that the level detectors sense only the linear sweep voltage, as illustrated in the specific examples of circuits for the level detectors in FIG. 5. These level detectors actuate one or the other of relay coils $RL_7$ and $RL_9$ when the sweep voltage reaches the corresponding value to close relay contact $rl_7$ or relay contacts $rl_{91}$ and $rl_{92}$ in the logic circuit 30 and thereby control the desired operation, as will be described in detail with reference to FIGS. 10 and 11. It should be also noted that, although in FIG. 3 both the linear voltage and the square wave voltage are amplified in cell driving amplifier 12 before being applied to cell 11, the linear voltage may be directly coupled to the cell to act therein in combination with the amplified square wave voltage. This does not result in the charging current component disturbing the faradaic current component at the output of the faradaic current detector, because the charging current component due to the variation of the linear voltage is of low frequency to be cut off by frequency selective amplifier 18.

In FIG. 3, there is shown a connection between the terminal Y(DC) of oscilloscope 21 and the junction between cell 11 and resistors $R_1$ or $R_2$, which connection only represents a convenient means for using the illustrated apparatus without application of the square wave voltage.

FIGS. 5 to 10, inclusive, show specific examples of circuits that may be employed as components of the apparatus schematically illustrated on FIG. 3. Since most of the circuitry shown in FIGS. 5 to 10 will be readily understood by those skilled in the art, such circuitry is hereinafter described only to the extent as is considered necessary to understand the invention. Also it should be noted that, in the circuitry of FIGS. 5 to 10, a relay contact designated by reference character "*rl*" followed by a numeral is actuated upon energization of a relay coil designated by reference character "RL" followed by the same numeral or by the same numeral as the first digit of the designation of the relay contact.

Referring particularly to FIG. 5, it will be noted that the circuitry there shown includes the cell, the sweep generator, the level detectors and associated relays $RL_7$ and $RL_9$, the cell driving amplifier and resistors for deriving the cell current which are comprised in the block drawn in broken lines and labeled "Cell and Associated Driving and Sensing Circuitry" on FIG. 3. At the left-hand side of FIG. 5, there is shown a relay contact $rl_{51}$ which is normally closed to short-circuit a capacitor $C_1$ having its lower plate grounded. The top plate of capacitor $C_1$ is connected through a resistor $R_3$ to a relay contact $rl_{81}$ which is normally in position to be connected with a source of negative voltage, for example, —200 v. The top plate of capacitor $C_1$ is also connected with the base of a pnp transistor $t_1$ through a cathode-anode path of a diode $D_1$ and the base of the transistor is connected to ground through a resistor $R_4$, whereby its potential is normally held at ground level. The transistor $t_1$ has its emitter connected to ground through an adjustable resistor $R_5$ and a resistor $R_6$ in series and the righthand end of the resistor $R_5$ is connected to a source of negative voltage, —200 v., through a cathode-anode path of a Zener diode $ZD_1$ and a resistor $R_7$ in series therewith. The coil of relay $RL_7$ is connected to the collector of transistor $t_1$ at one end and to the junction between the anode of Zener diode $ZD_1$ and resistor $R_7$ at the other. The relay coil $RL_7$ is bridged by a diode $D_2$ to prevent the influence of the transients. The potential at the emitter of transistor $t_1$ is adjusted by resistor $R_5$ to be slightly more positive than —2 v. Thus, transistor $t_1$ and the associated components form a level detector for the potential at the top plate of capacitor $C_1$ in that, when this potential falls below —2 v., the transistor is forward biased to conduct, whereupon current flows through resistors $R_6$, $R_5$, transistor $t_1$, relay coil $RL_7$ and resistor $R_7$, thereby energizing relay $RL_7$. The potential at the top plate of capacitor $C_1$ is then locked at —2 v. The relay coil $RL_7$, when energized, serves to reverse the direction of the sweep after a delay caused by its inherent characteristics.

A similar level detector is connected across capacitor $C_1$ and comprises a npn transistor $t_2$ having its base connected to the top plate of capacitor $C_1$ through a cathode-anode path of a diode $D_3$ and having its emitter connected to ground through a movable point on an adjustable resistor $R_9$. The other end of resistor $R_9$ is connected through a resistor $R_{10}$ to a source of negative voltage, —200 v. The base-emitter path of transistor $t_2$ is bridged by a resistor $R_8$. The emitter of transistor $t_2$ is further connected to a source of positive voltage, for example, +200 v., through an anode-cathode path of a Zener diode $ZD_2$ and a resistor $R_{11}$ in series. The coil of relay $RL_9$ is bridged by a diode $D_4$ and connected to the collector of transistor $t_2$ at one end and to the junction between the Zener diode $ZD_2$ and a resistor $R_{11}$ at the other. The potential at the emitter of transistor $t_2$ is adjustably held slightly more negative with respect to ground. Thus, as the potenial at the op plate of capacitor $C_1$ rises toward a positive value after relay contact $rl_{81}$ has been switched to the other position from that shown on FIG. 2, the base-emitter path of transistor $t_2$ is forwardly biased to cause the conduction of the transistor, whereby relay coil $RL_9$ is energized to actuate the associated contacts $rl_{91}$ and $rl_{92}$ contained in the logic circuit shown on FIG. 10, thereby serving to terminate the sweep.

The sweep voltage varying from 0 v. to —2 v. and then from —2 v. to 0 v. is obtained at the top plate of capacitor $C_1$ when relay coil $RL_5$ is energized to open the associated relay contact $rl_{51}$. When this occurs, capacitor $C_1$ is charged from the voltage source of —200 v. through resistor $R_3$ of a high resistance, such as IMΩ. It will be seen that the time constant of this charging circuit will be 50 seconds when capacitor $C_1$ has a capacitance of 50 microfarads. Since according to the invention the sweep from 0 v. to —2 v. is completed within a very short time period, for example, one-half second, the time constant of 50 seconds is one hundred times greater than the sweep time period and therefore it will be appreciated that the sweep voltage has an excellent linearity with respect to time. Similar linearity is obtained during the sweep in the reverse direction when relay contact $rl_{81}$ is moved to the other position in which it is connected to a source of positive voltage, for example, +200 v.

The linearly varying sweep voltage is applied to the control grid of a triode $V_1$ which is connected in a cathode follower configuration. The output from the cathode follower, as divided by resistors $R_{12}$ and $R_{13}$, is coupled to the control grid of a pentode $V_2$ through a resistor $R_{14}$. This control grid is also connected with one end of a resistor $R_{15}$, of which the other end is coupled to the junction between resistors $R_{16}$ and $R_{17}$ forming a voltage divider. The end of the resistor $R_{17}$ remote from the junction is connected with the cathode of a diode $D_5$ as well as the anode of a diode $D_6$, and the anode of the diode $D_5$ and the cathode of the diode $D_6$ are connected with stable voltage sources of −6 v. and +6 v., respectively. The arrangement is such that the square wave voltage coupled through a resistor $R_{18}$ is clipped in amplitude between −6 v. and +6 v. The square wave voltage is supplied from the output of the square wave generator indicated at 14 and 15 on FIG. 3 and shown in a particular example on FIG. 7, in which specific example the square-wave voltage is derived from the cathode of a cathode follower tube $V_{36}$. The output from the plate of tube $V_2$ is D.C. coupled to the control grid of a triode $V_3$ (FIG. 5) which is connected in a cathode follower configuration, and the cathode of triode $V_3$ is coupled to the control grid of pentode $V_2$ through a resistor $R_{19}$ to provide for negative feedback, thereby improving the stability and the linearity of the amplifier. It will be seen that the output from the cathode of triode $V_3$ is applied to the mercury pool electrode of the cell and that the dropping mercury electrode is connected through parallel resistors $R_{20}$ and $R_{21}$ to ground, these resistors $R_{20}$ and $R_{21}$ being equivalent to the resistors $R_1$ and $R_2$ as shown on FIG. 3. A variable point on the adjustable resistor $R_{21}$ is connected with the control grid of a pentode $V_4$ which has its cathode connected tobether with the cathode of pentode $V_2$ and connected through a common resistor $R_{22}$ to a biasing voltage source, for example, −85 v. It will be understood that an increase in the input voltage to the control grid of pentode $V_2$ causes the voltage across the cell to decrease, thereby resulting in a more negative input to the control grid of tube $V_4$, so that the voltage drop across the resistor $R_{22}$ is decreased. This has the net effect that tube $V_4$ provides positive feedback to tube $V_2$. The voltage across the cell is fed to an X-axis amplifier or cell-voltage amplifier shown in detail on FIG. 8. Across the resistor $R_{20}$ is connected a potentiometer P, which is shown as comprising a chain of resistors, and is for the purpose of adjusting the sensitivity. A suitable tap on potentiometer P is connected to the faradaic current detector shown in detail on FIG. 6 to provide a cell current input. The upper end of resistor $R_{20}$ or $R_{21}$ is also connected to the start signal generator shown in detail on FIG. 9. Another connection is shown to be made from the upper end of resistor $R_{20}$ to the Y(DC) terminal of the oscilloscope in FIG. 3 for the purpose of permitting use of the apparatus as a DC polarograph.

Referring now to FIG. 6, it will be seen that the particular circuitry there shown to constitute the faradaic current detector described above in connection with FIG. 3 comprises a conventional AC amplifier constituted by a pentode $V_5$ having its input connected to a suitable tap on the potentiometer P of FIG. 5. The input voltage to the AC amplifier will have a wave form as illustrated at B on FIG. 4. The output from the plate of pentode $V_5$ is coupled to the control grid of a pentode $V_6$ through a capacitor $C_2$, resistor $R_{23}$ and a capacitor $C_3$ in series. The resistor $R_{23}$ serves the purpose of preventing a flow of grid current when an input of large magnitude is applied to the control grid of pentode $V_6$. The junction between resistor $R_{23}$ and capacitor $C_3$ is coupled, through a pair of oppositely connected diodes $D_7$ and $D_8$, to stable voltage sources of −0.5 v. and +0.5 v., respectively, in order to clip the amplitude of the input signal appearing at the control grid of tube $V_6$. Another pentode $V_7$ having similar operating characteristics as tube $V_6$ is shown with its control grid connected to ground through a capacitor $C_4$. The pentodes $V_6$ and $V_7$ constitute a gate which functions in the manner described above with respect to the gate 17 on FIG. 3. An additional function of pentodes $V_6$ and $V_7$ is to keep the voltage at the plate of either pentode constant when there is no input signal at the control grid of pentode $V_6$. Both of these requirements are fulfilled by arranging tubes $V_6$ and $V_7$ so that they are alternately conducting or cut off, and so that tube $V_6$ can amplify its input only during the time which is determined by the gate pulse mentioned hereinabove. To this end, the suppressor grid of each pentode $V_6$ or $V_7$ is fed with different gating signals formed from the gate pulse which is supplied from the square wave generator. Specifically, the gate pulse, as produced at the output of the AND circuit 23 of FIG. 3, is applied to the control grid of a pentode $V_{12}$ shown at the left-hand side of the lower portion of FIG. 6. The control grid of pentode $V_{12}$ is connected, through a pair of oppositely connected diodes $D_9$ and $D_{10}$, to stable voltage sources of +5 v. and −5 v., respectively, to clip the amplitude of the incoming gate pulse. Another pentode $V_{13}$ has its cathode connected together with the cathode of pentode $V_{12}$ to a biasing voltage source through a common resistor $R_{24}$. The control grid of pentode $V_{13}$ is directly grounded, so that it will be seen that the input to pentode $V_{13}$ is of equal amplitude and opposite polarity, respectively, to the amplitude and polarity of the input to pentode $V_{12}$. Therefore, the output from tube $V_{12}$, as coupled to the suppressor grid of gate tube $V_6$ through a capacitor $C_5$, will be of equal amplitude with and of opposite phase to the output from tube 13, as coupled to the suppressor grid of tube $V_7$ through a capacitor $C_6$, assuming that both tubes $V_{12}$ and $V_{13}$ have a same degree of amplification. The diode circuitry to the right of the capacitors $C_5$ and $C_6$ merely forms a shaping circuit for the gating signals. As will be later further described with reference to FIG. 7, the gate pulse applied to the control grid of pentode $V_{12}$ has such a wave form that it normally remains high, for example at a value of +5 v., and sinks to a lower value, for example of −5 v., when it is desired to gate the cell current. Thus, pentode $V_{12}$ is normally heavily conducting so that the potential at the right-hand plate of capacitor $C_5$ is held constant at −40 v. by a conducting diode $D_{11}$, the anode of which is connected to a stable voltage source of −40 v. When the gate pulse input at the control grid of pentode $V_{12}$ sinks to the lower level, the potential at the right-hand plate of capacitor $C_5$ is held substantially at 0 v. by a conducting diode $D_{12}$ having its cathode grounded. Similar clamping or locking action is achieved by diodes $D_{13}$ and $D_{14}$ for the potential at the right-hand plate of capacitor $C_6$. A resistor $R_{25}$ is connected between the suppressor grid of tube $V_6$ and the voltage source of −40 v. to pull the potential at the suppressor grid to −40 v. when neither of the diodes $D_{11}$ or $D_{12}$ conducts. A resistor $R_{26}$ connected between the cathode of the diode $D_{14}$ and ground serves a similar purpose to that of resistor $R_{25}$. When the potential at the right-hand plate of capacitor $C_5$ is held substantially at −40 v., this negative potential applied to the suppressor grid of pentode $V_6$ causes the tube to be cut off, while tube $V_7$ is rendered conductive by a bias at 0 v. When the gate pulse is on, tube $V_6$ is switched to a conducting state and any input signal or the cell current is amplified only during the time determined by the duration and position in time of the gate pulse. The tube $V_7$ remains cut off at this time.

The output from tube $V_6$ is applied to the control grid of a triode $V_8$ through a resistor $R_{27}$ and a capacitor $C_7$ in series. The resistor $R_{27}$ serves to prevent an input of excessive magnitude from causing a grid current as mentioned before. Similar resistors appear in the circuits to be described subsequently, but will not be referred to specifically. Another triode $V_9$ is connected in cascade connection with triode $V_8$. The output from triode $V_8$ is coupled through a capacitor $C_8$ to a filter comprising a pair of T-circuits connected in parallel. One of these T-circuits includes resistors $R_{28}$ and $R_{29}$ in series, the junction therebetween being connected to ground through a capacitor $C_9$. The other T-circuit includes capacitors $C_{10}$ and $C_{11}$ in series, the junction therebetween being grounded through a resistor $R_{30}$. The circuit parameters of the filter are selected so that it has a high and sharp attenuation factor at the frequency of the square wave voltage. The output side of the filter is connected across the grid and cathode of triode $V_9$. The arrangement is such that the amplifier consisting of tubes $V_8$, $V_9$ and the filter acts to amplify only that component of the cell current which has the frequency of the square wave voltage. The output from this frequency selective amplifier is coupled through a capacitor $C_{12}$ to another frequency selective amplifier comprising tubes $V_{10}$ and $V_{11}$ and of the same construction as just described.

The ouput from the second frequency selective amplifier will have a waveform as depicted at E on FIG. 4, and is coupled through a capacitor $C_{13}$ and a current limiting resistor $R_{31}$ to an amplifier stage comprising a pentode $V_{14}$. To prevent saturation of amplifier tube $V_{14}$, a pair of Zener diodes $ZD_3$ and $ZD_4$ are oppositely connected in series between the right-hand side of resistor $R_{31}$ and the ground, thereby limiting the amplitude of the incoming signal. Zener diodes $ZD_3$ and $ZD_4$ are bridged by resistors $R_{32}$ and $R_{33}$ forming a voltage divider and the junction of these resistors is connected with the control grid of pentode $V_{14}$. As will be noted from the drawing, current feedback is provided for the amplifier tube $V_{14}$. The amplifier stage comprising the tube $V_{14}$ is followed by two further amplifier stages of similar construction comprising pentodes $V_{15}$ and $V_{16}$, respectively. The output from tube $V_{16}$ is coupled through a capacitor $C_{14}$, which has a relatively large capacitance to decrease its impedance to the output signal, to the primary winding of a transformer $T_1$. Tranformer $T_1$ has a pair of secondary winding for cooperation with diodes $D_{15}$ and $D_{16}$ to rectify each half-wave of the alternating signal at the output of tube $V_{16}$. The center tap or junction of the secondary windings is not grounded as usual, but the secondary winding of another transformer $T_2$ is connected between the center tap and the junction between resistors $R_{35}$ and $R_{36}$. The other end of resistor $R_{35}$ is connected to the cathode of diode $D_{15}$, while the other end of resistor $R_{36}$ is connected to the cathode of diode $D_{16}$ which is grounded. The resistor $R_{35}$ or $R_{36}$ is bridged by a smoothing capacitor $C_{15}$ or $C_{16}$, respectively. The primary winding of transformer $T_2$ has one of its ends grounded and the other end is connected to the source of the square wave voltage. The purpose of transformer $T_2$ is to provide a biasing voltage for diodes $D_{15}$ and $D_{16}$ which is in phase with the square wave voltage, thereby achieving a synchronous detection of the cell current with respect to the square wave voltage. It will be noted that the voltage across capacitors $C_{15}$ and $C_{16}$ is a difference between the rectified outputs from diodes $D_{15}$ and $D_{16}$. This differential output is applied to the Y(sq) axis of the oscilloscope 21 shown in FIG. 3.

Referring to FIG. 7, there is shown a specific example of a circuit for the square wave generator which includes the astable and bistable multivibrators 14, 15, the AND circuit 23 and the brightness control gate 31 shown in block form in FIG. 3. The square wave generator provides the square wave voltage to the cell driving amplifier (FIG. 5). The same square wave voltage is supplied to the synchronous detector mentioned above. The square wave generator cooperates with the AND circuit 23 of FIG. 3 to provide the gate pulse to the gate 17 (FIG. 3) of the faradaic current detector. In addition, the output from the astable multivibrator 14 is fed to the brightness control of the oscilloscope. Specifically, there is shown a pair of triodes $V_{17}$ and $V_{18}$ constituting an astable multivibrator. Pairs of triodes $V_{19}$ and $V_{20}$, $V_{21}$ and $V_{22}$, $V_{23}$ and $V_{24}$, $V_{25}$ and $V_{26}$, and $V_{27}$ and $V_{28}$ form bistable multivibrator stages $BM_1$ to $BM_5$. Since astable and bistable multivibrators are well known in the art, their circuits will not be described herein. For further details of such circuits reference can be made, for example, to a book entitled "Pulses and Digital Circuits" by J. Millman, published by McGraw-Hill Book Company in 1956, and particularly to pages 154 and 199 thereof. The values for circuit parameters indicated in the drawing are selected so that the astable multivibrator consisting of triodes $V_{17}$ and $V_{18}$ provides a square ware having a repetition frequency of 96 kc./s. and having a mark to space ratio equal to unity. A bistable stage is known to have two complementing outputs which may be called a true output and a complement output. Therefore, it will be assumed here that an output from the odd-numbered tube, such as $V_{19}$, represents a true output, while an output from the even numbered tube, such as $V_{20}$, represents a complement output. It is further assumed that the true output has the same levels as the complement output. Thus, the true output will be at a higher level when the complement output is at a lower level and the true output will be switched, upon receiving an input, to the lower level, while the complement output will then assume the higher level. Each of bistable multivibrator stages $BM_1$ to $BM_5$ is triggered by every falling end of a pulse input from the preceding stage or of the output from the astable multivibrator. Therefore, the stage $BM_1$ provides at its output, a square wave of half the frequency of the output from the astable multivibrator. Similar stepping down of the frequency is performed in the successive stages. Thus, the fifth stage $BM_5$ provides a square wave of 96 kc./s. divided by the fifth power of two, or 3 kc./s. The 3 kc./s. square wave from the fifth stage $BM_5$ is coupled from the true output of that stage to a triode $V_{36}$ through a capacitor $C_{17}$. The triode $V_{36}$ is connected in a cathode follower configuration and the square wave voltage of 3 kc./s is derived from the cathode of this tube through a capacitor $C_{18}$. The right-hand plate of this capacitor is connected to the lower end of resistor $R_{18}$ shown at the bottom of FIG. 5. The output from the fifth stage $BM_5$ is also coupled through a capacitor $C_{19}$ to the control grid of a triode $V_{35}$ which is connected in a similar manner as the tube $V_{36}$ to supply, through a capacitor $C_{20}$, the square wave voltage of 3 kc./s to the sychronous detector shown at the lower right-hand corner of FIG. 6.

In FIG. 7, it will be noted that the complement output of the first stage $BM_1$ is connected to the control grid of a triode $V_{30}$ through a capacitor $C_{21}$. Also capacitors $C_{22}$, $C_{23}$ and $C_{24}$ couple the true outputs of the second, third and fourth bistable stages $BM_2$ to $BM_4$ respectively, to the control grids of triodes $V_{31}$, $V_{32}$ and $V_{33}$. The cathodes of the four triodes $V_{30}$ to $V_{33}$ are connected together and connected to the ground through a common resistor $R_{37}$. It will be appreciated that the voltage across the resistor $R_{37}$ will depend upon the conducting states of the triodes $V_{30}$ to $V_{33}$. The bias to the control grid of any of these triodes is set so that the triode will be cut off when the output from the associated bistable stage is at the lower level, but will be rendered conductive when the output from the associated bistable stage is at the higher level. Therefore, the voltage across resistor $R_{37}$ will be at minimum or at null when none of the triodes $V_{30}$ to $V_{33}$ is conducting. This occurs when all of the control grids of tubes $V_{30}$ to $V_{33}$ receive inputs of the lower level from stages $BM_1$ to $BM_4$. Assuming that initially bistable stages $BM_1$ to $BM_5$ have such phase that their true outputs are at the higher level concurrently, the true output from stage $BM_4$ will be at the lower level after the astable multivibrator has issued eight individual square waves and will remain at this lower level during the period of subsequent eight square waves. The true output from stage $BM_3$ will be at the lower level during the periods from 5th to 8th and from 13th to 16th individual square waves from the astable multivibrator. The period during which the true output from stage $BM_2$ remains at the lower level may be represented in terms of the output square wave from the astable multivibrator as extending from the third to fourth from the seventh to eighth, from the eleventh to twelfth and from the fifteenth to sixteenth. Thus, the true outputs from stages $BM_2$ to $BM_4$ will be concurrently at the lower level while the astable multivibrator provides its fifteenth and sixteenth square wave. The complement output from stage $BM_1$ is at the lower level during the period of the fifteenth square wave, so that during the period of sixteen successive individual square waves of 96 kc./s. from the astable multivibrator, the potential at the cathodes of tubes $V_{30}$ to $V_{33}$ is at null only for the period of the fifteenth square wave. In other words, tubes $V_{30}$ to $V_{33}$ form an AND circuit and the voltage across resistor $R_{37}$ becomes null toward the end of each half period of the square wave voltage of 3 kc./s. The cathodes of tubes $V_{30}$ to $V_{33}$ are connected through a resistor $R_{38}$ to the junction between the anode of a diode $D_{13}$ and one plate of a capacitor $C_{25}$. The other plate of capacitor $C_{25}$ is connected with the grid of a triode $V_{34}$ which is connected in a cathode follower configuration. The cathode of the diode $D_{13}$ is coupled to a source of positive voltage, such as +32 v., and the arrangement is such that when one or more of the tubes $V_{30}$ to $V_{33}$ is or are conducting, the resulting voltage drop across resistor $R_{37}$ causes the potential at the anode of diode $D_{13}$ to be held at the positive value, for example, +32 v., of the source connected to the cathode thereof. Therefore, the potential at the cathode of triode $V_{34}$ will be at a lower level only during every fifteenth square wave of 96 kc./s., emitted from the astable multivibrator. The cathode of tube $V_{34}$ is coupled through a capacitor $C_{26}$ to the gate pulse input indicated at the lower left-hand portion of FIG. 6.

The output from the astable multivibrator is also coupled to the grid of a triode $V_{29}$ through a capacitor $C_{27}$. The triode $V_{29}$ is connected in a cathode follower configuration and its cathode is connected to one plate of a capacitor $C_{28}$ which has its other plate connected to the movable contact of a normally open relay contact $rl_3$ connected to the brightness control of the oscilloscope, designated by reference character Z. Thus when the coil of relay $RL_3$ in the logic circuit (FIG. 10) is energized, the normally open contact $rl_3$ is connected with the cathode of the triode $V_{29}$ and square waves of 96 kc./s. pass from the astable multivibrator to the brightness control to brighten the spot of the oscilloscope.

FIG. 8 shows a specific example of an X-axis or cell voltage amplifier. Both electrodes of the cell are connected to the control grids of pentodes $V_{37}$ and $V_{38}$ which form a differential amplifier. The output from one of these pentodes is passed through a low pass filter comprising a resistor $R_{39}$ and a capacitor $C_{29}$ before being applied to the control grid of a triode $V_{39}$. The parameters of the filter are selected so that it by-passes the square wave voltage component of the cell voltage to ground. The cathode of the cathode follower tube $V_{39}$ is connected to the X-axis terminal of the oscilloscope, and applies thereto only the linear sweep voltage as amplified.

Referring to FIG. 9, there is shown an example of the start signal generator. The voltage drop caused by the cell current across resistor $R_{20}$ (FIG. 5) is applied, through a capacitor $C_{30}$, to the control grid of a pentode $V_{40}$ which forms a conventional amplifier. The output of this amplifier is coupled through a capacitor $C_{31}$ and a current limiting resistor $R_{40}$ in series to the grid of a triode $V_{41}$ which is arranged to provide current feedback by way of a resistor $R_{41}$ connected between the cathode of that triode and the ground. The primary winding of a transformer $T_3$ has one end connected to the plate of the triode $V_{41}$ through a capacitor $C_{32}$ having a relatively large capacitance so as to present a low impedance for 3 kc./s. component. The center tap of the secondary winding of the transformer $T_3$ is grounded and the ends of such secondary winding are connected to the cathodes of diodes $D_{17}$ and $D_{18}$, respectively. The anodes of these diodes are combined together and connected to one end of a parallel connection of a capacitor $C_{33}$ and a resistor $R_{42}$, the other end of the parallel connection being grounded. The capacitance of capacitor $C_{33}$ is chosen so that it by-passes those components of the rectified output which vary much more rapidly than the linearly varying sweep voltage. The arrangement is much like a detector stage in a conventional receiver unit where the audio-frequency signal is obtained separately from the carrier wave. The signal obtained in this case across resistor $R_{42}$ is the envelope of successive peaks of the cell current. The envelope is then differentiated by a differentiator comprising a capacitor $C_{34}$ and a resistor $R_{43}$. The differentiated output across resistor $R_{43}$ is coupled through a capacitor $C_{35}$ to a monostable multivibrator which comprises a pair of triodes $V_{42}$ and $V_{43}$. Such monostable multivibrator is shown and described on page 187 of the book cited before, and the monostable multivibrator shown is arranged to energize a relay coil $RL_1$ connected in the plate circuit of triode $V_{42}$ for a period determined by the time constant of a capacitor $C_{36}$ and resistors $R_{44}$ and $R_{45}$. Particularly, tube $V_{43}$ is normally conducting and tube $V_{42}$ is normally cut off. When the mercury drop falls, the charging current, and hence the amplitude of the envelope, will decrease abruptly. Since the envelope or the voltage across resistor $R_{42}$ had been growing in the negative direction, there will be obtained at this time across resistor $R_{43}$ a positive-going impulse which is coupled to the grid of triode $V_{42}$, thereby causing conduction of this triode. When triode $V_{42}$ conducts, its plate potential is lowered whereby capacitor $C_{36}$ begins to be charged through the resistors $R_{44}$ and $R_{45}$ with its right-hand plate positive. The charging of capacitor $C_{36}$ prevents conduction of the tube $V_{43}$ even after the differentiated impulse-like input has been removed from the grid of tube $V_{42}$. The tube $V_{43}$ restores its conduction after a preset interval determined by the time constant of the components $C_{36}$, $R_{44}$ and $R_{45}$ as well as the characteristics of tube $V_{43}$. When tube $V_{43}$ restores conduction, the voltage drop across cathode resistor $R_{46}$ causes interruption of the conduction of tube $V_{42}$. The time interval during which tube $V_{43}$ is blocked or has its conduction interrupted, or during which relay coil $RL_1$ is energized, can be varied by adjustment of resistor $R_{45}$.

FIG. 10 shows a specific example of the logic circuit for properly controlling the operation of the various components described above. For the sake of convenience, the operation of the logic circuit will be described in connection with FIG. 11 which shows the timing of operation of the various components and the waveforms of the cell current and cell voltage. In FIG. 11, it should be noted that the time indications are not precisely to scale. In the following description, Roman numerals appearing in parentheses refer to the order of items immediately preceding each numeral in the operation sequence and correspond to the points in time indicated by the same Roman numerals on FIG. 11. It should be also noted that relay contacts are shown on FIG. 10 in their normal positions, that is, when the associated relay coils are not energized. Diodes connected in parallel with the relay coils on FIG. 10 serve to prevent the influence of the transients.

Toward the end of the life of a mercury drop, the cell current, as sampled from across resistor $R_{20}$ (FIG. 5), is reaching its maximum (I), as illustrated on FIG. 11 by a wave form for the cell current, and will be seen on the oscilloscope when a horizontal sweep of long period, for example, several seconds is employed. All relay coils except $RL_2$ have dropped, that is, are not energized. A self-holding circuit is maintained for relay coil $RL_2$ as long as relay contact $rl_{11}$ remains unactuated. It will be seen that the energizing circuit for relay coils $RL_3$, $RL_4$ and $RL_{10}$ is broken by actuation of another relay contact $rl_{22}$. The relay coil $RL_1$ is picked or energized (III) when a synchronizing pulse is obtained from differentiator $C_{34}$, $R_{43}$ of FIG. 9 in response to the fall of the mercury drop (II). When relay coil $RL_1$ is energized, the normally closed relay contact $rl_{11}$ is opened, whereby relay coil $RL_2$ drops (IV). In FIG. 11 it will be noted that due to the mechanical time lag inherent in relays, there is a delay between the energization of relay coil $RL_1$ and the deenergization of relay coil $RL_2$. The relay coil $RL_1$ continues to be energized for a relatively long period, for example, five seconds as determined by the monostable multivibrator consisting of triodes $V_{42}$ and $V_{43}$ shown on FIG. 9. When relay coil $RL_1$ drops (V), relay contact $rl_{12}$ returns to its normal position shown, and since then relay contact $rl_{22}$ remains closed, relay coils $RL_3$, $RL_4$ and $RL_{10}$ will be energized through a normally closed relay contact $rl_{91}$ (VI). When picked or energized, relay coil $RL_3$ closes the normally open relay contact $rl_3$ shown in the lower left-hand portion of FIG. 7 to energize the brightness control of the oscilloscope with square waves of 96 kc./s. Such square waves are effective to brighten the spot continuously. By energization of relay coil $RL_4$, the relay contact $rl_{41}$ will be closed to thereby energize relay coil $RL_5$ (VII). The effect of this is that relay contact $rl_{51}$, shown at the left-hand end of FIG. 5, is opened, thereby permitting commencement of the sweep, as indicated at the bottom of FIG. 11. Since relay coil $RL_8$ has not yet been energized, relay contact $rl_{81}$ (FIG. 5) remains in its normal position so that the sweep will be started first in the negative direction. After relay contact $rl_{52}$ has been closed by energization of relay coil $RL_5$, relay coil $RL_6$ will be energized at a predetemined time interval (VIII) determined by the time constant of a resistor $R_{47}$ and a capacitor $C_{37}$. The relay coil $RL_6$ will be deenergized (XVIII) at said predetermined time interval after relay contact $rl_{52}$ is opened, which follows the deenergization of relay coil $RL_5$ (XVI) which is in turn caused by the opening of relay contact $rl_{41}$ (XV). Thus, it will be appreciated that either of relay contacts $rl_6$ and $rl_{10}$ connected in parallel across the input to the monostable multivibrator of FIG. 9 is closed between the points in time VI and XVIII, thereby preventing operation of the start signal generator during the sweep. Thus relay contacts $rl_6$ and $rl_{10}$ serve as inhibit gates.

When the sweep voltage reaches —2 v. (IX), relay coil $RL_7$ (FIG. 5), is energized by the —2 v. detector (X) to close the normally open relay contact $rl_7$, thereby energizing relay coil $RL_8$ (XI). The relay coil $RL_8$ maintains its self-holding circuit by way of relay contact $rl_{82}$. The relay contact $rl_{81}$, shown in FIG. 5, moves to the opposite position, so that the direction of the sweep is reversed. When the sweep voltage becomes less negative than —2 v., relay coil $RL_7$ drops (XII). When the sweep voltage exceeds zero and reaches a small positive value (XIII), as determined by the design of the 0 v. detector, relay coil $RL_9$ is energized (XIV) to open relay contact $rl_{91}$ and to close relay contact $rl_{92}$. Then relay coils $RL_3$, $RL_4$ and $RL_{10}$ drop or are deenergized and relay coil $RL_2$ is energized. The relay contact $rl_{22}$ which is opened by energization of relay $RL_2$ ensures that relay coils $RL_3$, $RL_4$ and $RL_{10}$ remain deenergized when relay contact $rl_{91}$ returns to its normal position. Because relay coil $RL_3$ drops upon completion of the sweep, relay contact $rl_3$ is opened to terminate the brightening of the spot (XV). The relay coil $RL_5$ drops or is deenergized by the opening of relay contact $rl_{41}$ (XVI). Deenergization of relay coil $RL_5$ returns relay contact $rl_{51}$ to its normal position in which it short-circuits capacitor $C_1$ (FIG. 5) so that the sweep voltage returns to zero (XVI). Thereafter, relay coil $RL_9$ ceases to be energized by the 0 v. detector (XVII). Finally relay coil $RL_6$ is deenergized (XVIII). Only relay coil $RL_2$ remains energized by its self-holding circuit through relay contact $rl_{21}$. This completes one cycle of the operation of the oscillopolarograph.

While the invention has been particularly described with reference to a particular embodiment shown in the drawings, it should be apparent to those skilled in the art that various modifications can be made therein without departing from the scope or spirit of the invention as defined in the appended claims.

What is claimed is:

1. In an oscillopolarograph comprising a polarographic cell having a dropping electrode and to which there is applied a varying voltage consisting of a linearly varying voltage component and a square wave voltage component of a frequency substantially higher than the dropping frequency of the electrode to cause a current flow in the cell; the combination of cell-driving amplifier means for amplifying at least said square wave voltage component of the varying voltage applied to said cell, feedback means effecting a positive feedback of a portion of the cell current to said cell-driving amplifier means to thereby achieve a reduced time constant for a charging current component of said cell current, gating means operative to pass a signal proportional to said cell current during a part of each half-period of each square wave, whereby said signal is associated with the electrode action and is free of the charging current, filter means allowing the passage therethrough of the component of said signal which has the frequency of said square wave voltage, and means operated by the filtered component of said signal to indicate the cell current associated with electrode action as a function of the linearly varying voltage.

2. An oscillopolarograph according to claim 1; a resistor being connected in series with said cell to detect the cell current and said gating means being connected across said resistor.

3. An oscillopolarograph according to claim 1; in which said means to indicate the cell current associated with electrode action as a function of the linearly varying voltage consists of an oscilloscope.

4. An oscillopolarograph according to claim 1; in which said filter means is constituted by a frequency-selective amplifier operative to pass only said component of the signal having the frequency of said square wave voltage.

5. An oscillopolarograph according to claim 1; a first resistor being connected in series with said cell to detect the cell current and said gating means being connected across said first resistor, and further comprising rectifier means receiving the voltage across said first resistor as an input thereto and providing a rectified output, low pass filter means receiving said rectified output and consisting of a capacitor and a second resistor, said capacitor serving to by-pass higher-frequency components of said voltage, whereby said rectifier means and said low pass filter means act to produce across said second resistor an envelope of successive peaks of the cell current caused by said square wave voltage, and differentiating means connected across said second resistor and operative to produce a synchronizing pulse indicative of the fall of said dropping electrode for initiating each sweep of the cell.

6. In an oscillopolarograph having a linearly varying voltage superposed with a square wave voltage applied to its polarographic cell through an amplifier for at least said square wave voltage; the combination of feedback means effecting a positive feedback to the input of said amplifier of a portion of the cell current, thereby to reduce the time constant for the charging current component of said cell current, and faradaic current detector circuit means sampling the cell current during each half-period of said square wave voltage and including filter means passing only that component of the sampled cell current which has the frequency of said square wave voltage.

References Cited

UNITED STATES PATENTS

| | | | |
|---|---|---|---|
| 2,725,524 | 11/1955 | Davis | 324—31 |
| 2,766,423 | 10/1956 | Barker | 324—31 |
| 3,065,410 | 11/1962 | Davis et al. | 324—31 |

RUDOLPH V. ROLINEC, *Primary Examiner.*

WALTER L. CARLSON, *Examiner.*

C. F. ROBERTS, *Assistant Examiner.*